(12) United States Patent
Schaefer et al.

(10) Patent No.: US 9,792,114 B1
(45) Date of Patent: Oct. 17, 2017

(54) SOURCE CODE ELEMENT SIGNATURES (71) Applicant: SEMMLE LIMITED, Oxford (GB)

(72) Inventors: Max Schaefer, Oxford (GB); Julian Tibble, Oxford (GB); Pavel Avgustinov, Oxford (GB)

(73) Assignee: Semmle Limited, Oxford (GB)

( * ) Notice: Subject to any disclaimer, the term of this patent is extended or adjusted under 35 U.S.C. 154(b) by 0 days.

(21) Appl. No.: 15/289,787

(22) Filed: Oct. 10, 2016

(51) Int. Cl.
G06F 9/45 (2006.01)
G06F 9/44 (2006.01)

(52) U.S. Cl.
CPC ............ G06F 8/75 (2013.01); G06F 8/71 (2013.01); G06F 8/433 (2013.01); G06F 8/70 (2013.01); G06F 8/751 (2013.01)

(58) Field of Classification Search
CPC ..... G06F 8/70; G06F 8/71; G06F 8/75; G06F 8/751; G06F 11/3604; G06F 11/3608
See application file for complete search history.

(56) References Cited

U.S. PATENT DOCUMENTS

| | | | | |
|---|---|---|---|---|
| 4,558,413 A * | 12/1985 | Schmidt | ................. | G06F 8/71 707/695 |
| 6,453,465 B1 * | 9/2002 | Klein | ................. | G06F 8/41 704/9 |
| 6,981,250 B1 * | 12/2005 | Wiltamuth | ................. | G06F 8/71 707/999.202 |
| 7,614,047 B1 * | 11/2009 | Wang | ................. | G06F 8/65 709/203 |
| 7,933,870 B1 * | 4/2011 | Webster | ................. | G06F 17/30174 707/638 |
| 8,402,435 B1 * | 3/2013 | Spiro | ................. | G06F 8/48 717/120 |
| 8,539,475 B2 * | 9/2013 | Ershov | ................. | G06F 8/75 717/170 |
| 9,110,737 B1 | 8/2015 | Tibble et al. | | |

(Continued)

OTHER PUBLICATIONS

Davies, J., et al., Software Bertillonage: Finding the Provenance of an Entity, Proceedings of the 8th Working Conference on Mining Software Repositories, 2011, pp. 183-192, [retrieved on Jun. 6, 2017], Retrieved from the Internet: <URL:http://dl.acm.org/>.*

(Continued)

Primary Examiner — Geoffrey St Leger
(74) Attorney, Agent, or Firm — Fish & Richardson P.C.

(57) ABSTRACT

Methods, systems, and apparatus, including computer programs encoded on computer storage media, for generating signatures for source code elements. One of the methods includes generating a respective signature for each source code element of the plurality of source code elements, including obtaining a name of the source code element, obtaining one or more of a location of a compilation unit containing the source code element and contents of the compilation unit containing the source code element, and generating the signature including combining a first representation of the name of the source code element and one or more of a second representation of the location of the compilation unit and a third representation of the contents of the compilation unit containing the source code element, wherein at least two of the plurality of source code elements have a same name and different respective signatures.

33 Claims, 3 Drawing Sheets (56) References Cited

U.S. PATENT DOCUMENTS

| | | | |
|---|---|---|---|
| 9,218,169 B2* | 12/2015 | Rajanna | G06F 8/43 |
| 9,372,903 B1* | 6/2016 | Richt | G06F 17/30563 |
| 9,405,915 B2* | 8/2016 | Sheridan | G06F 21/577 |
| 9,471,285 B1* | 10/2016 | Koohgoli | G06F 9/54 |
| 9,489,182 B1 | 11/2016 | Cawley et al. | |
| 2003/0135842 A1* | 7/2003 | Frey | G06F 8/71 |
| | | | 717/121 |
| 2007/0256069 A1* | 11/2007 | Blackman | G06F 8/433 |
| | | | 717/170 |
| 2010/0242028 A1* | 9/2010 | Weigert | G06F 21/105 |
| | | | 717/131 |
| 2010/0293533 A1* | 11/2010 | Andrade | G06F 8/10 |
| | | | 717/140 |
| 2011/0078674 A1* | 3/2011 | Ershov | G06F 8/75 |
| | | | 717/170 |
| 2013/0339399 A1* | 12/2013 | Dorris | G06F 17/30297 |
| | | | 707/803 |
| 2014/0283081 A1* | 9/2014 | Sheridan | G06F 21/577 |
| | | | 726/25 |
| 2015/0143339 A1* | 5/2015 | Rajanna | G06F 8/43 |
| | | | 717/123 |
| 2015/0268953 A1* | 9/2015 | Koezuka | G06F 8/71 |
| | | | 717/121 |
| 2015/0347129 A1* | 12/2015 | Chittimalli | G06F 8/73 |
| | | | 717/123 |
| 2015/0363292 A1* | 12/2015 | Shiraishi | G06F 11/3604 |
| | | | 717/125 |

OTHER PUBLICATIONS

Toomey, W., Ctcompare: Code Clone Detection Using Hashed Token Sequences, Proceedings of the 6th International Workshop on Software Clones, 2012, pp. 92-93, [retrieved on Jun. 6, 2017], Retrieved from the Internet: <URL:http://dl.acm.org/>.*

Schwarz, N., et al., On How Often Code is Cloned across Repositories, Proceedings of the 34th International Conference on Software Engineering, 2012, pp. 1289-1292, [retrieved on Jun. 6, 2017], Retrieved from the Internet: <URL:http://dl.acm.org/>.*

* cited by examiner

SOURCE CODE ELEMENT SIGNATURES

BACKGROUND

This specification relates to static analysis of computer software source code.

Static analysis refers to techniques for analyzing computer software source code without executing the source code as a computer software program. Source code is typically maintained by developers in a code base of source code using a version control system. The code base includes one or more revisions of the source code in the code base.

Compilers and interpreters distinguish source code elements from one another by their names. Some source code elements have names that unambiguously identify a source code element. For example, within a single compilation classes in Java are uniquely identified by their fully qualified names. If any two source code elements in a same compilation have the same fully qualified name, the Java compiler raises an error.

However, static analysis systems often encounter source code elements that have identical names but which are actually different source code elements. Compilers and interpreters will only raise naming errors for a single compilation or interpretation, but a static analysis system can analyze source code elements from multiple different compilations or interpretations.

When a static analysis system assigns the same name to different source code elements that are actually different, undesirable things can happen. Properties from the different source code elements can be conflated or merged. For example, if the static analysis system counts lines of source code for a particular Java class that has the same name as another Java class, the class may end up having a number of lines of code that is a sum of lines of code of the individual classes. In addition, some attributes that are implicitly understood as being unique may actually have multiple values, e.g., a file path for a particular source code element or a first statement of a method.

The following scenarios illustrate common situations in which a static analysis system can encounter different source code elements having the same name.

For example, the code base may contain, in different files, source code elements having identical names that are never involved in the same compilation. This commonly occurs in testing suites when different test classes simply happen to have the same name.

In addition, a same source code element defined in a single file can be involved in multiple compilations with different compiler settings or environment variables, which can affect the semantics of the source code element. In this situation, each encounter with the source code element should be considered an encounter with a different source code element, even though their names are the same.

Some build systems may also modify the text of the source code during a build process, which can also affect properties of a source code element. In other words, a source code element in a later compilation may be properly considered a different source code element due to changes made by the build system after a previous compilation of the source code element.

Conversely, undesirable things can also happen when a static analysis system assigns different names to source code elements that are actually the same. For example dependencies can be missed and data flow may not be properly tracked. This can happen, for example, when a different representation of the same source code element is encountered multiple times during a build process. For example, a first compilation can compile a source code element to generate a compiled representation of the source code element. Later in the build process, a second compilation can load or use the compiled representation of the source code element. In many situations, these different representations should be considered to be the same.

However, a further complication is that whether or not two source code elements having the same name should be considered to be the same is often application specific. For example, a same source code element can be defined in multiple files that are identical copies of the same library. There are some applications, e.g., violation finding, where these copies should be considered identical. And there are other applications, e.g., dependency analysis, where these copies should be considered to be distinct.

SUMMARY

This specification describes how a system can generate signatures for source code elements that uniquely identify the source code elements even in very sophisticated build systems.

Particular embodiments of the subject matter described in this specification can be implemented so as to realize one or more of the following advantages. Generating signatures for source code elements reduces the chance that different source code elements that have the same name are considered to be the same in static analysis results. In addition, generating signatures reduces the chance that different names are assigned to source code elements that are actually the same. The signatures help to avoid errors in the static analysis results due to conflation, duplication, and misplaced dependencies. A static analysis system can use application-specific requirements in determining whether or not source code elements having the same names should be considered the same or different.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

This specification describes generating signatures for source code elements.

Each source code element is a named component of the source code of the code base. Source code elements thus include variables, functions, classes, types, and packages, to name just a few examples. Each compilation unit can be either a text source code file or a compiled version of a text source code file, e.g., a compiled library, an object file, a byte code file, or a class file.

Figure 1:
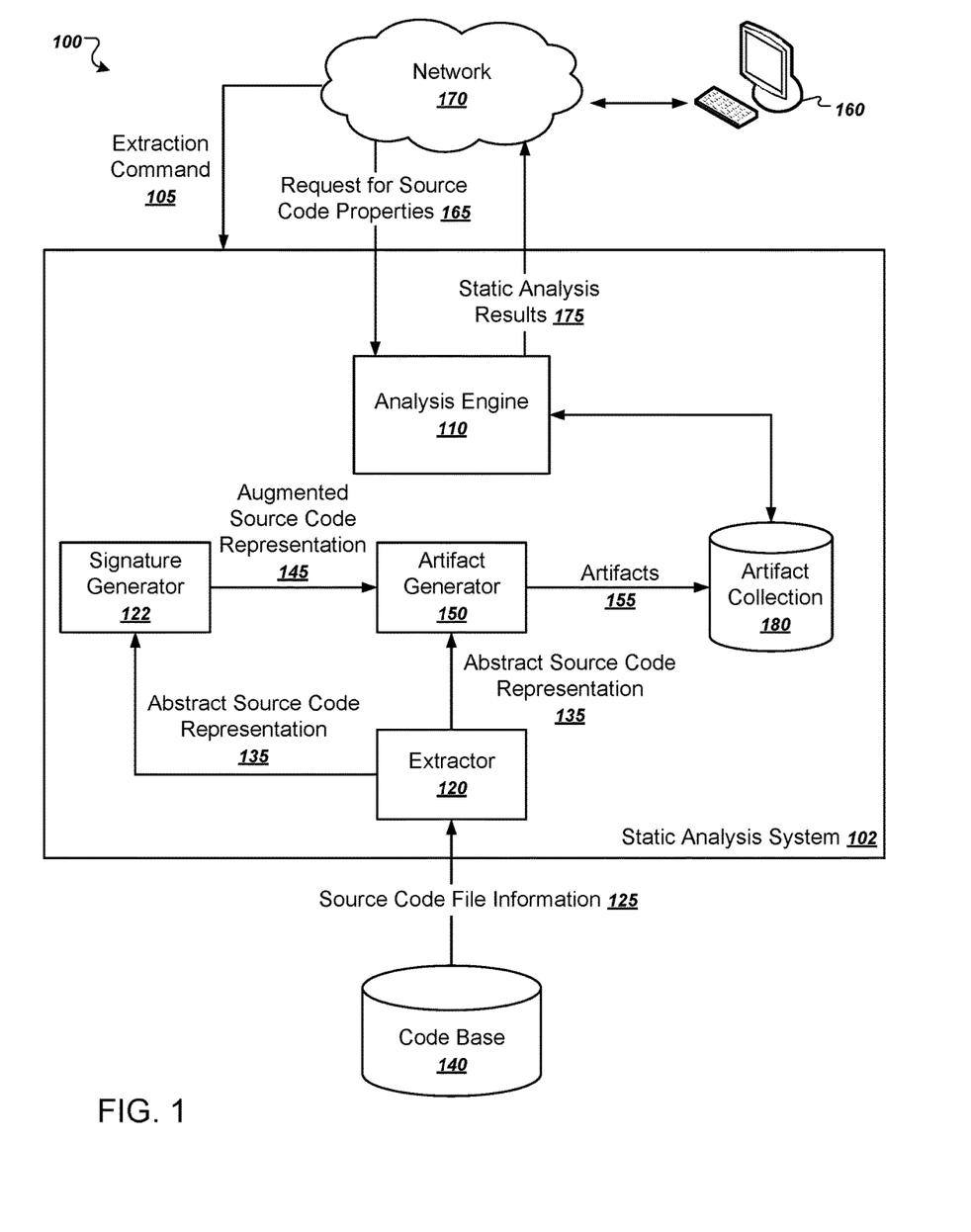
FIG. 1 is a diagram of an example system.

FIG. 1 is a diagram of an example system 100. The system 100 includes a user device 160 in communication with a static analysis system 102 over a network, 170, which can be any appropriate communications network. The system 100 is an example of a system in which a static analysis system 102 employs a signature generator 122 to generate signatures for extracted source code elements.

The static analysis system includes an analysis engine 110, a signature generator 122, a source code extractor 120, and an artifact generator 150 that stores analysis artifacts in an artifact collection 180. The components of the static analysis system 102 can be implemented as computer programs installed on one or more computers in one or more locations that are coupled to each through a network. Alternatively, the static analysis system 102 can be installed in whole or in part on a single computing device, e.g., the user device 160.

The static analysis system 102 analyzes source code in a code base 140. The code base 140 can store source code that is either compiled, e.g., by a build system, or not compiled. For example, the code base 140 can include code written in interpreted languages such as Python or JavaScript that do not use a compiler at all.

In operation, the user device 160 provides an extraction command 105 to the static analysis system 102. The extraction command 105 is a request for the static analysis system 102 to extract and analyze source code in the code base 140. In response to the extraction command 105, the static analysis system 102 receives source code file information 125. For example, the source code file information 125 can include the source code itself or a location, e.g., a file path, to a source code file.

In some implementations, the static analysis system 102 causes a build system to initiate a build of source code in the code base 140 and extracts the source code as the build is progressing. Suitable techniques for instrumenting build systems are described in more detail in U.S. Pat. No. 9,110,737, entitled "Extracting Source Code," and in U.S. application Ser. No. 14/947,631, entitled "Transparent Process Interception," both of which are herein incorporated by reference.

Regardless of the instrumentation technique that is used, the extractor 120 receives the source code file information 125 and possibly other information, e.g., configuration information, e.g., environment variables, or compiler configuration information, e.g., compiler flags, used to compile the source code files.

The extractor 120 uses the accessed source code to generate an abstract code representation 135. The abstract source code representation includes an identification of one or more source code elements.

An artifact generator 150 receives the abstract source code representation 135 and generates one or more artifacts 155, which are stored in an artifact collection 180. An analysis artifact is a collection of data generated by a component of a static analysis system, as opposed to an object file or an executable file generated by the build system 130. Analysis artifacts can be stored as files of a file system or stored in any appropriate data repository, e.g., as records in a database.

The analysis artifacts 155 generated by a static analysis system typically include various properties of the source code elements in the source code files, e.g., information that describes relationships between source code elements in the source code, e.g., between types, variables, functions, and classes.

The system can make static analysis results more accurate by generating signatures for the source code elements in the abstract source code representation 135 rather than identifying the source code elements by names that occur in the source code itself or by names assigned by a parser or compiler of the build system 130. As described above, doing so can reduce errors that arise due to conflation, duplication, and misplaced dependencies.

To generate signatures for source code elements, the system 102 can use a signature generator 122. The signature generator 122 receives an abstract source code representation 135. For each of one or more source code elements in the abstract source code representation 135, the signature generator 122 generates a signature. In some cases, this results in generating different signatures for source code elements having identical fully qualified names and identical file locations.

The signature generator 122 can then provide the generated signatures to the artifact generator 150, e.g., as an augmented source code representation 145. The artifact generator 150 can then generate artifacts 155 that identify and distinguish the source code elements in the augmented source code representation 145 by their signatures rather than by their names.

To provide static analysis results, the system 102 receives, from the user device 160, a request for source code properties 165 of a portion of the code base 140. An analysis engine 110 receives the request 165 and uses data stored in the artifact collection 180 to generate static analysis results 175.

The analysis engine 110 then provides the static analysis results 175 back to the user device 160, where the user device 160 presents the results 175 to a user. For example, the static analysis results can be presented as part of an integrated development environment (IDE) or in a command line environment. The static analysis results 175 can identify properties of source code elements in the code base 140, e.g., how many lines of code, methods, or violations, are included in a particular class or file, as well as messages that explain the associated property.

Figure 2:
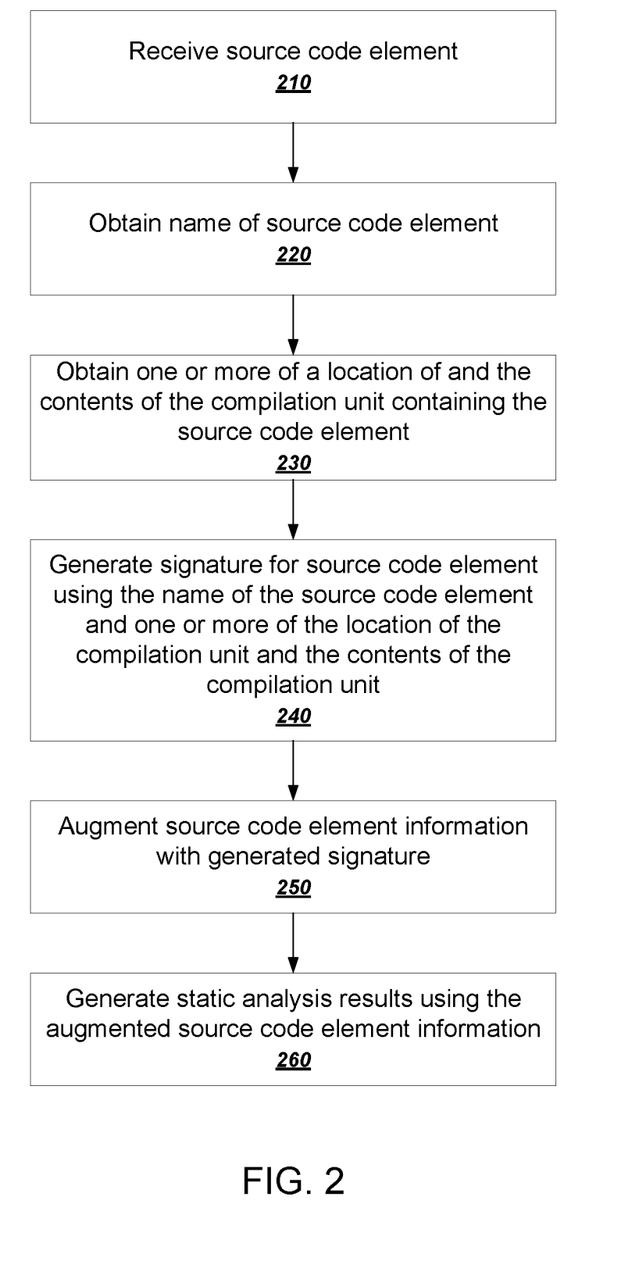
FIG. 2 is a flow chart of an example process for generating signatures for source code elements.

FIG. 2 is a flow chart of an example process for generating signatures for source code elements. The process will be described as being performed by an appropriately programmed system of one or more computers, e.g., the static analysis system 102 of FIG. 1.

The system receives a source code element (210). For example, as described above, a static analysis system can instrument a build system to extract source code that is processed by the build system. For each source code element in the source code, the system can generate a respective signature.

The system obtains a name of the source code element (220). Generally, each source code element has a name used to identify the source code element. In some programming languages, the name of a source code element has a path and an identifier. In Java, classes are identified by their fully qualified names.

The system obtains one or more of a location of and the contents of the compilation unit containing the source code element. (230). The compilation unit can be an original plain text source code file or a compiled representation of source code. An example of a compilation unit that is a compiled representation of source code is a byte code file.

The system generates a signature for the source code element using the name of the source code element and one or more of the location of the compilation unit and the contents of the compilation unit (240). The system can use any appropriate technique for generating a signature from these pieces of information so long as source code elements associated the same information will result in the same signature. The system will typically use a technique, e.g., hashing, that results in a low probability of signature collisions.

Which pieces of information are used will depend on the requirements of the system. For example, in some systems, multiple copies of the same library file having the same contents may exist in multiple different file system locations. For these systems, it may be sufficient to generate a signature from only the name of the source code element and a representation of the library file's contents. In other words, the fact that multiple copies of the library files exist in different locations in the file system will not result in the library files having different signatures.

However, in other systems it may not be sufficient to consider such library files as the same file. In these cases, the system can also use the location of the compilation unit when generating the signature. For example, if the static analysis system records dependency information about which source code elements depend on which other source code elements, strange results can occur if identical instances of a library file are considered to be the same. This can result in the system identifying a dependency of one source code element on a library located in a remote or counter-intuitive location of the code base. In reality, the source code element may actually simply depend on a library file located in the same directory as a file containing the source code element.

As one example of a technique for generating signatures, the system can simply concatenate these pieces of information used to generate the signature. However, the system can reduce the size of the signature by generating an alternative representation of one or more pieces of information. For example, the system can hash one or more of the name, the location of the compilation unit, and the contents of the compilation unit and generate a signature by combining the results. The system may, but need not, use all of the information when generating the alternative representation. For example, the system can generate a hash of the first 10, 50, or 500 bytes of the compilation unit or location of the containing file. As another example, the system can hash one or more of these pieces of information, combine the results, and then hash the result again.

Alternatively or in addition, the system can also use other pieces of information associated with the source code element when generating the signature.

For example, in some build processes, the same source code file gets compiled multiple times with different compiler settings. It may be useful for a static analysis system to consider the results of these different compilations as different entities, particularly for programming languages, e.g., C++, in which compilers configurations can significantly alter the output of the compilation.

Thus, the system can also generate the signature using a representation of the compiler settings that were used to compile the compilation unit containing the source code element. The extractor of a static analysis system has access to such information by virtue of instrumenting the build system, as described above.

A static analysis system can also use semantic information when generating the signature. In other words, instead of using just the text of a source code file when generating the signature, the system can use a semantic representation of the source code file. For example, the system can use a parser to generate the semantic representation, e.g., an abstract syntax tree (AST), and then generate the signature using the properties of the semantic representation. For example, the system can concatenate names of all nodes in the AST as the semantic representation. The system can then combine the semantic representation with the other pieces of information, optionally using hashes as described above to reduce the size of the semantic representation.

The system augments source code element information with the generated signature (250). For example, the system can populate a database with the signature generated for the source code element. In some implementations, the system uses the signature as a key for the source code element in the database. Thus, the system considers source code elements having the same signature to be the same.

The system generates static analysis results using the augmented source code element information (260). For example, during the extraction process the system can compile properties and statistics about the source code element and store the information in a database in association with the generated signature. Because the generated signatures disambiguate source code elements that would otherwise have the same name or even the same file system location, there is no conflation or merging of source code properties. Then, when the system receives a request for static analysis results, the system can obtain accurate results from the populated database.

A static analysis system can also take into consideration source code elements that are encountered multiple times in different kinds of compilation units during a build process.

As described above, a static analysis system can generate signatures for either original or compiled versions of source code elements. For example, the system can generate a signature for a .java file, which can be a plain text source code file, a .class file, which can be a compiled version of the plain text source code file, or both.

The original and compiled versions are often encountered multiple times during a build process. For example, a class A can be defined in the source code file A.java. A class B can be defined in the source code file B.java, and the class B can depend on the class A.

A build system can first compile A.java to produce A.class. The build system can then compile B.java to produce B.class, and in doing so, load A.class. And as described above, the static analysis system can instrument the build system so that whenever a file is compiled, an extractor obtains the contents of the files involved in the compilation.

If the system uses content-based signatures, the class A will have two signatures: one when A.java is compiled, and another when A.class is loaded. To address this issue, the system can treat previously compiled source code elements differently from other source code elements.

Figure 3:
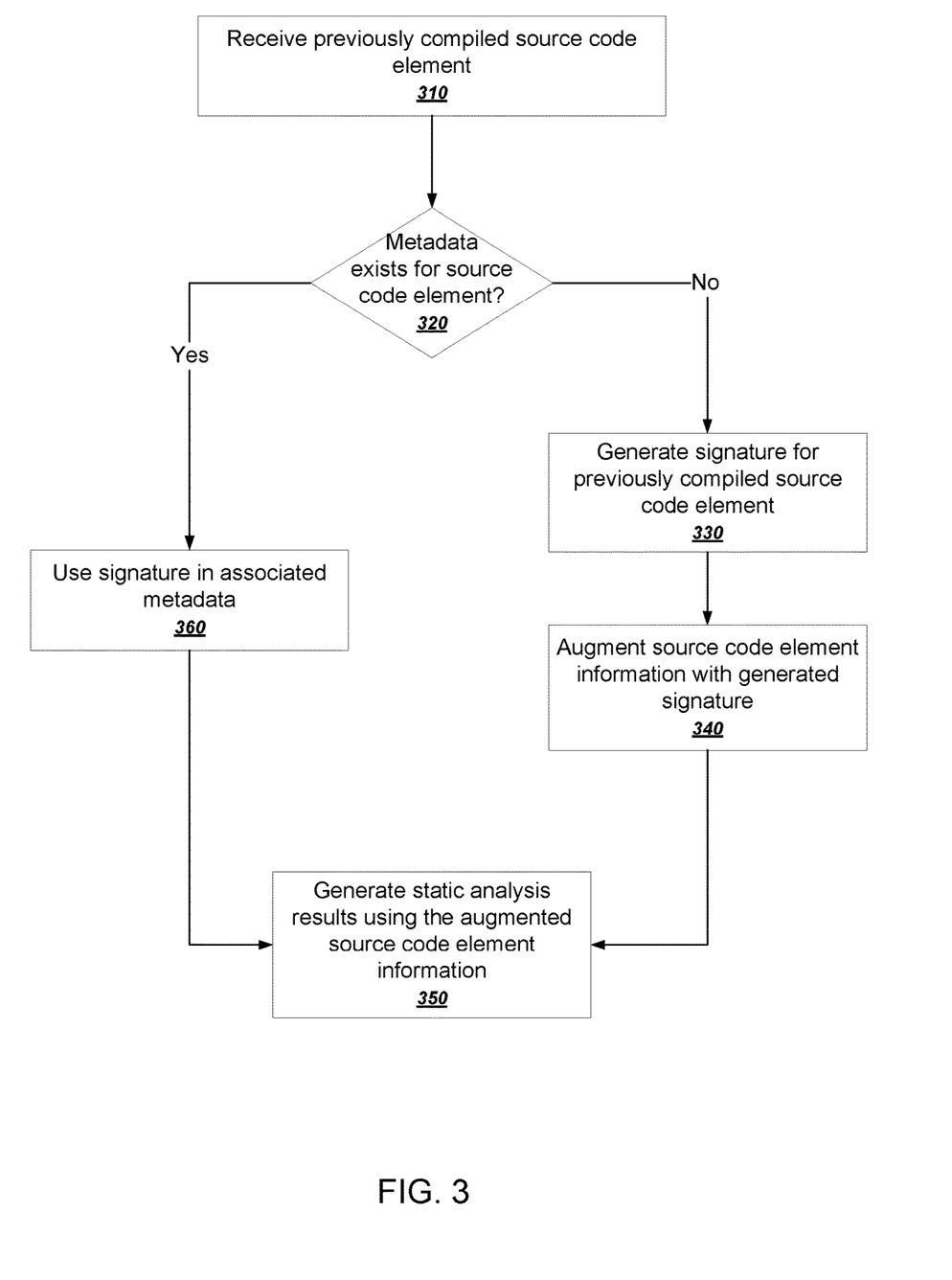
FIG. 3 is a flow chart of an example process for obtaining signatures for previously compiled source code elements.

FIG. 3 is a flow chart of an example process for obtaining signatures for previously compiled source code elements. The process will be described as being performed by an appropriately programmed system of one or more computers, e.g., the static analysis system 102 of FIG. 1.

The system receives a previously compiled source code element (310). The system can receive the previously compiled source code element during compilation of a source code file that depends on the previously compiled source code element.

The system determines whether metadata exists for the previously compiled source code element (320). The system can maintain metadata for compiled source code elements for which signatures have already been generated. The metadata can specify the signature that was previously generated for the original source code file. For example, the system can store a record in a database for the compiled source code element, record file system metadata for the compiled source code element, or augment the compilation unit having the compiled source code element with metadata information.

To support this process, the system will update the metadata whenever generating signatures for source code elements as described above with reference to FIG. 2. For example, when the system generates a signature for a .java file and generates a corresponding .class file, the system can attach metadata having the signature to the .class file.

If no metadata exists for the previously compiled source code element (320), the system generates a signature for the previously compiled source code element (branch to 330). The system can use the example process as described above with respect to FIG. 2 to generate a signature based on the name of the source code element and the location and contents of the compilation unit that contains the source code element.

In some implementations, the system generates a signature for a previously compiled source code element using only the contents and the location of the compilation unit, e.g., by combining and possibly hashing the contents and the location into a signature. For example, if the compilation unit is a compiled library, the system may no longer have access to the source code element name. Thus, the system generates a signature using only the contents and location of the compilation unit. In other words, the system can use a first signature generation process for source code elements that the system compiles and a different signature generation process for source code elements that the system does not compile.

The system augments source code information with the generated signature (340). For example, the system can update a database that records a signature for each source code element.

The system generates static analysis results using the augmented source code element information (350). As described above, the system can use the signature to uniquely distinguish the previously compiled source code element from other source code elements that happen to have the same name.

If metadata does exist for the source code element (320), the system uses the signature in metadata associated with the source code element (branch to 360). This can mean that the source code element was previously processed by another compilation. Thus, the system can simply ignore the source code element, bypassing the generation of any new properties for the source code element.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program which may also be referred to or described as a program, software, a software application, an app, a module, a software module, a script, or code) can be written in any form of programming language, including compiled or interpreted languages, or declarative or procedural languages, and it can be deployed in any form, including as a stand-alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a data communication network.

For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

As used in this specification, an "engine," or "software engine," refers to a software implemented input/output system that provides an output that is different from the input. An engine can be an encoded block of functionality, such as a library, a platform, a software development kit ("SDK"), or an object. Each engine can be implemented on any appropriate type of computing device, e.g., servers, mobile phones, tablet computers, notebook computers, music players, e-book readers, laptop or desktop computers, PDAs, smart phones, or other stationary or portable devices, that includes one or more processors and computer readable media. Additionally, two or more of the engines may be implemented on the same computing device, or on different computing devices.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and pointing device, e.g, a mouse, trackball, or a presence sensitive display or other surface by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone, running a messaging application, and receiving responsive messages from the user in return.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface, a web browser, or an app through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

In addition to the embodiments and the embodiments described above, the following embodiments are also innovative:

Embodiment 1 is a method comprising:
  receiving a plurality of source code elements extracted from a code base;
  generating a respective signature for each source code element of the plurality of source code elements, including:
    obtaining a name of the source code element,
    obtaining one or more of a location of the source code element and contents of a compilation unit containing the source code element, and
    generating the signature including combining a first representation of the name of the source code element and one or more of a second representation of the location of the compilation unit and a third representation of the contents of the compilation unit containing the source code element,
  wherein at least two of the plurality of source code elements have a same name and different respective signatures;
  generating one or more respective properties for each source code element uniquely identified by a respective signature; and
  storing the one or more respective properties for each source code element in association with the signature for the source code element.

Embodiment 2 is the method of embodiment 1, further comprising obtaining two or more source code elements having identical file system locations and having identical names; and
  generating different respective signatures for each of the two or more source code elements.

Embodiment 3 is the method of any one of embodiments 1-2, wherein generating the signature comprises combining a first representation of the name of the source code element, the second representation of the location of the compilation unit, and the third representation of the contents of the compilation unit containing the source code element.

Embodiment 4 is the method of any one of embodiments 1-3, wherein generating the signature comprises combining a first representation of the name of the source code element and a hash of the contents of the compilation unit containing the source code element.

Embodiment 5 is the method of any one of embodiments 1-4, wherein generating the one or more respective properties comprises generating, for source code element having a unique signature, only a single value for a property considered to be unique.

Embodiment 6 is the method of any one of embodiments 1-5, wherein generating the signature comprises combining a first representation of the name of the source code element and a fourth representation of compiler settings used to compile the source code element.

Embodiment 7 is the method of any one of embodiments 1-6, wherein generating the signature comprises combining a first representation of the name of the source code element and a fifth representation of a semantic representation of the compilation unit.

Embodiment 8 is the method of any one of embodiments 1-7, further comprising:
receiving a request for static analysis results for the code base; and
generating static analysis results that identify respective properties for source code elements identified by respective signatures.

Embodiment 9 is the method of any one of embodiments 1-8, further comprising:
determining that a particular compilation unit for a source code element is a previously compiled version of an initial source code file;
determining that the compilation unit is not associated with any previously generated signature for a source code element occurring in the initial source code file; and
in response to determining that the compilation unit is not associated with any previously generated signature for a source code element occurring in the initial source code file, generating a new signature for the source code element.

Embodiment 10 is the method of embodiment 9, wherein generating a new signature for the source code element comprises generating a new signature using the contents of the source code file and the location of the source code file.

Embodiment 11 is the method of any one of embodiments 1-10, further comprising:
determining that a particular compilation unit for a source code element is a previously compiled version of an initial source code file;
determining that the compilation unit is associated with a previously generated signature for the source code element occurring in the initial source code file; and
using the previously generated signature for the source code element occurring in the initial source code file as the signature for the source code element.

Embodiment 12 is a system comprising: one or more computers and one or more storage devices storing instructions that are operable, when executed by the one or more computers, to cause the one or more computers to perform the method of any one of embodiments 1 to 11.

Embodiment 13 is a computer storage medium encoded with a computer program, the program comprising instructions that are operable, when executed by data processing apparatus, to cause the data processing apparatus to perform the method of any one of embodiments 1 to 11.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain some cases, multitasking and parallel processing may be advantageous.

What is claimed is:

1. A computer-implemented method comprising:
receiving a plurality of source code elements extracted from a code base, wherein each source code element of the plurality of source code elements occurs in a respective compilation unit of a plurality of compilation units, and wherein one or more of the compilation units are source code files and one or more of the compilation units are compiled compilation units;
generating a respective unique signature for each source code element of the plurality of source code elements, including:
determining whether the source code element occurs in a compiled compilation unit or occurs in a source code file,
whenever the source code element occurs in a compiled compilation unit, determining whether the compiled compilation unit is associated with a signature previously generated using an initial source code file used to generate the compiled compilation unit,
whenever the compiled compilation unit is associated with a signature previously generated using the initial source code file used to generate the compiled compilation unit, reusing the previously generated signature as the signature for the source code element,
whenever the source code element occurs in a source code file, generating a new signature for the source code element, including:
obtaining a name of the source code element,
obtaining a location of the source code file containing the source code element, contents of the source code file containing the source code element, or both, and
generating the signature including combining (i) a first representation of the name of the source code element and (ii) a second representation of the location of the source code file containing the source code element, a third representation of the contents of the source code file containing the source code element, or both,
wherein at least two of the plurality of source code elements have a same name and different respective signatures;

generating one or more respective properties for each source code element uniquely identified by a respective signature; and storing the one or more respective properties for each source code element in association with the signature for the source code element.

2. The method of claim 1, further comprising obtaining two or more source code elements having identical file system locations and having identical names; and generating different respective signatures for each of the two or more source code elements.

3. The method of claim 1, wherein generating the new signature comprises combining a first representation of the name of the source code element, the second representation of the location of the source code file containing the source code element, and the third representation of the contents of the source code file containing the source code element.

4. The method of claim 1, wherein generating the new signature comprises combining a first representation of the name of the source code element and a hash of the contents of the source code file containing the source code element.

5. The method of claim 1, wherein generating the one or more respective properties comprises generating, for a source code element having a unique signature, only a single value for a property considered to be unique.

6. The method of claim 1, wherein generating the new signature comprises combining a first representation of the name of the source code element and a fourth representation of compiler settings used to compile the source code element.

7. The method of claim 1, wherein generating the new signature comprises combining a first representation of the name of the source code element and a fifth representation of a semantic representation of the source code file containing the source code element.

8. The method of claim 1, further comprising:

receiving a request for static analysis results for the code base; and generating static analysis results that identify respective properties for source code elements identified by respective signatures.

9. The method of claim 1, wherein generating a respective unique signature for each source code element of the plurality of source code elements comprises:

whenever the source code element occurs in a compiled compilation unit that is not associated with a signature, generating a new signature for the source code element.

10. The method of claim 9, wherein generating the new signature for a source code element that occurs in a compiled compilation unit that is not associated with a signature comprises generating the new signature using only the contents of the initial source code file and the location of the initial source code file.

11. The method of claim 1, further comprising: after generating the signature for a source code element occurring in a source code file, compiling the source code file to generate a compiled compilation unit and associating the compiled compilation unit with the signature generated using the source code file.

12. A system comprising:

one or more computers and one or more storage devices storing instructions that are operable, when executed by the one or more computers, to cause the one or more computers to perform operations comprising:

receiving a plurality of source code elements extracted from a code base, wherein each source code element of the plurality of source code elements occurs in a respective compilation unit of a plurality of compilation units, and wherein one or more of the compilation units are source code files and one or more of the compilation units are compiled compilation units;

generating a respective unique signature for each source code element of the plurality of source code elements, including:

determining whether the source code element occurs in a compiled compilation unit or occurs in a source code file, whenever the source code element occurs in a compiled compilation unit, determining whether the compiled compilation unit is associated with a signature previously generated using an initial source code file used to generate the compiled compilation unit, whenever the compiled compilation unit is associated with a signature previously generated using the initial source code file used to generate the compiled compilation unit, reusing the previously generated signature as the signature for the source code element, whenever the source code element occurs in a source code file, generating a new signature for the source code element, including:

obtaining a name of the source code element, obtaining a location of the source code file containing the source code element, contents of the source code file containing the source code element, or both, and generating the signature including combining (i) a first representation of the name of the source code element and (ii) a second representation of the location of the source code file containing the source code element, a third representation of the contents of the source code file containing the source code element, or both, wherein at least two of the plurality of source code elements have a same name and different respective signatures;

generating one or more respective properties for each source code element uniquely identified by a respective signature; and storing the one or more respective properties for each source code element in association with the signature for the source code element.

13. The system of claim 12, wherein the operations further comprise obtaining two or more source code elements having identical file system locations and having identical names; and generating different respective signatures for each of the two or more source code elements.

14. The system of claim 12, wherein generating the new signature comprises combining a first representation of the name of the source code element, the second representation of the location of the source code file containing the source code element, and the third representation of the contents of the source code file containing the source code element.

15. The system of claim 12, wherein generating the new signature comprises combining a first representation of the name of the source code element and a hash of the contents of the source code file containing the source code element.

16. The system of claim 12, wherein generating the one or more respective properties comprises generating, for a source code element having a unique signature, only a single value for a property considered to be unique.

17. The system of claim 12, wherein generating the new signature comprises combining a first representation of the name of the source code element and a fourth representation of compiler settings used to compile the source code element.

18. The system of claim 12, wherein generating the new signature comprises combining a first representation of the name of the source code element and a fifth representation of a semantic representation of the source code file containing the source code element.

19. The system of claim 12, wherein the operations further comprise:
receiving a request for static analysis results for the code base; and
generating static analysis results that identify respective properties for source code elements identified by respective signatures.

20. The system of claim 12, wherein generating a respective unique signature for each source code element of the plurality of source code elements comprises:
whenever the source code element occurs in a compiled compilation unit that is not associated with a signature, generating a new signature for the source code element.

21. The system of claim 20, wherein generating the new signature for a source code element that occurs in a compiled compilation unit that is not associated with a signature comprises generating the new signature using only the contents of the initial source code file and the location of the initial source code file.

22. The system of claim 12, wherein the operations further comprise: after generating the signature for a source code element occurring in a source code file, compiling the source code file to generate a compiled compilation unit and associating the compiled compilation unit with the signature generated using the source code file.

23. A computer program product, encoded on one or more non-transitory computer storage media, comprising instructions that when executed by one or more computers cause the one or more computers to perform operations comprising:
receiving a plurality of source code elements extracted from a code base, wherein each source code element of the plurality of source code elements occurs in a respective compilation unit of a plurality of compilation units, and wherein one or more of the compilation units are source code files and one or more of the compilation units are compiled compilation units;
generating a respective unique signature for each source code element of the plurality of source code elements, including:
determining whether the source code element occurs in a compiled compilation unit or occurs in a source code file,
whenever the source code element occurs in a compiled compilation unit, determining whether the compiled compilation unit is associated with a signature previously generated using an initial source code file used to generate the compiled compilation unit,
whenever the compiled compilation unit is associated with a signature previously generated using the initial source code file used to generate the compiled compilation unit, reusing the previously generated signature as the signature for the source code element,
whenever the source code element occurs in a source code file, generating a new signature for the source code element, including:
obtaining a name of the source code element,
obtaining a location of the source code file containing the source code element, contents of the source code file containing the source code element, or both, and
generating the signature including combining (i) a first representation of the name of the source code element and (ii) a second representation of the location of the source code file containing the source code element, a third representation of the contents of the source code file containing the source code element, or both,
wherein at least two of the plurality of source code elements have a same name and different respective signatures;
generating one or more respective properties for each source code element uniquely identified by a respective signature; and
storing the one or more respective properties for each source code element in association with the signature for the source code element.

24. The computer program product of claim 23, wherein the operations further comprise obtaining two or more source code elements having identical file system locations and having identical names; and
generating different respective signatures for each of the two or more source code elements.

25. The computer program product of claim 23, wherein generating the new signature comprises combining a first representation of the name of the source code element, the second representation of the location of the source code file containing the source code element, and the third representation of the contents of the source code file containing the source code element.

26. The computer program product of claim 23, wherein generating the new signature comprises combining a first representation of the name of the source code element and a hash of the contents of the source code file containing the source code element.

27. The computer program product of claim 23, wherein generating the one or more respective properties comprises generating, for a source code element having a unique signature, only a single value for a property considered to be unique.

28. The computer program product of claim 23, wherein generating the new signature comprises combining a first representation of the name of the source code element and a fourth representation of compiler settings used to compile the source code element.

29. The computer program product of claim 23, wherein generating the new signature comprises combining a first representation of the name of the source code element and a fifth representation of a semantic representation of the source code file containing the source code elements.

30. The computer program product of claim 23, wherein the operations further comprise:
receiving a request for static analysis results for the code base; and
generating static analysis results that identify respective properties for source code elements identified by respective signatures.

31. The computer program product of claim 23, wherein generating a respective unique signature for each source code element of the plurality of source code elements comprises:
whenever the source code element occurs in a compiled compilation unit that is not associated with a signature, generating a new signature for the source code element.

32. The computer program product of claim 31, wherein generating the new signature for a source code element that occurs in a compiled compilation unit that is not associated with a signature comprises generating the new signature using only the contents of the initial source code file and the location of the initial source code file.

33. The computer program product of claim 23, wherein the operations further comprise: after generating the signature for a source code element occurring in a source code file, compiling the source code file to generate a compiled compilation unit and associating the compiled compilation unit with the signature generated using the source code file.

* * * * *

UNITED STATES PATENT AND TRADEMARK OFFICE
CERTIFICATE OF CORRECTION

PATENT NO. : 9,792,114 B1
APPLICATION NO. : 15/289787
DATED : October 17, 2017
INVENTOR(S) : Max Schaefer, Julian Tibble and Pavel Avgustinov It is certified that error appears in the above-identified patent and that said Letters Patent is hereby corrected as shown below:

In the Claims

At Column 16, Line 53, in Claim 29, after "containing the source code," delete "elements." and insert -- element. --, therefor.

Signed and Sealed this
Twenty-eighth Day of November, 2017

Joseph Matal
*Performing the Functions and Duties of the*
*Under Secretary of Commerce for Intellectual Property and*
*Director of the United States Patent and Trademark Office*